United States Patent [19]

Park

[11] Patent Number: 5,754,100

[45] Date of Patent: May 19, 1998

[54] SYSTEM FOR ASSISTING REVERSE CORNERING OPERATION OF VEHICLE AND METHOD FOR CONTROLLING THE SAME

[75] Inventor: Chon-Kyu Park, Seoul, Rep. of Korea

[73] Assignee: Kia Motors Corporation, Seoul, Rep. of Korea

[21] Appl. No.: 700,944

[22] Filed: Aug. 21, 1996

[30] Foreign Application Priority Data

Jul. 12, 1996 [KR] Rep. of Korea ............... 96 28116

[51] Int. Cl.$^6$ .................................................. B60Q 1/00
[52] U.S. Cl. ............... 340/435; 340/436; 340/465; 362/37; 362/40; 362/66; 315/82; 180/274
[58] Field of Search ........................... 340/435, 436, 340/903, 904, 443, 465, 437; 367/909; 362/37, 40, 65, 66; 180/167, 199, 274, 280; 315/82

[56] References Cited

U.S. PATENT DOCUMENTS 4,232,286  11/1980  Voll ............................. 340/904
5,099,400  3/1992  Lee ............................. 362/37
5,574,426  11/1996  Shisgal et al. ................ 340/435

FOREIGN PATENT DOCUMENTS 8-164790  6/1996  Japan .

*Primary Examiner*—Jeffery Hofsass
*Assistant Examiner*—Julie B. Lieu

[57] ABSTRACT

A system for assisting a reverse cornering of a vehicle includes: left and right cornering sensors, which are respectively mounted on left and right corners of the front side of the vehicle, for detecting objects which approach near the left and right corners; a warning device mounted near a driver's seat for generating a warning sound to a driver, when one of the cornering sensors detects objects approaching near the corners of the vehicle; and a head lamp angle adjusting device for adjusting the angle of left and right head lamps toward left and right side of the vehicle in accordance with the front wheel steering angle when the vehicle is in a reverse state.

8 Claims, 5 Drawing Sheets

SYSTEM FOR ASSISTING REVERSE CORNERING OPERATION OF VEHICLE AND METHOD FOR CONTROLLING THE SAME

FIELD OF THE INVENTION

The present invention relates to a system and method or assisting in a reverse cornering operation of a vehicle, and more particularly, to a system for assisting in a reverse cornering operation of a vehicle that operates a cornering sensor for detecting the presence of an object at the forward side of the vehicle and for adjusting each angle of the left and right head lamps, and a method for controlling the system.

BACKGROUND OF THE INVENTION

In general, lamp systems for vehicle include devices such as head lamps and fog lamps that function to enhance road visibility, especially at night, and devices such as turn signal lamps, tail lamps, and brake lamps that function to signal the driver's intent, for example turning or stopping, to other drivers and pedestrians.

In particular, a rear combination lamp of the lamp system for a vehicle includes: turn signal lights for indicating the driver's intention to turn the vehicle or change lanes, tail lights for warning other vehicles that the vehicle is in a reverse state, and brake lights for indicating the operation of brakes or the stopped state of the vehicle. In addition, a front combination lamp includes head lamps for illuminating the front of the vehicle, and turn signal lights for indicating the driver's intention to turn the vehicle or change lanes.

FIG. 1 illustrates illuminating angles of left and right head lamps 1 and 1' of a conventional vehicle, in which lamps 1 and 1' are respectively disposed on left and right corners of a front end of the vehicle to illuminate the forward side of the vehicle within each predetermined illuminating angle θ. The illuminating angles are also configured to overlap to more brightly illuminate the forward visual field.

For the above-described head lamps, however, when the vehicle is in a reverse cornering state, a corner portion opposite to the cornering direction disappears from the driver's visual field. As a result, there is an increased risk of accidents.

SUMMARY OF THE INVENTION

It is an object of the present invention to provide, a wide visual field angle to a driver by adjusting the angle of a head lamp in a direction opposite to a reverse cornering direction when the vehicle is in a reverse cornering state.

It is another object of the present invention to provide cornering sensors on opposite corners of the front side of the vehicle and generate warning sound when an object is detected within a predetermined range from the corners, thereby alerting a driver.

These and other objects may be achieved by a system for assisting a reverse cornering of a vehicle, which includes: left and right cornering sensors, which are respectively mounted on left and right corners of the front side of the vehicle, for detecting objects which approach near the left and right corners; and a warning device mounted near a driver's seat for generating a warning sound upon detecting of nearby objects by the cornering sensors; and a head lamp angle adjusting device for adjusting the angle of left and right head lamps toward left and right sides of the vehicle in accordance with the front wheel steering angle when the vehicle is in a reverse state.

According to a feature of the present invention, the cornering sensors are designed to detect an object approaching within 15 cm from the vehicle.

According to another feature of the present invention, the angle adjusting device comprises a wheel steering angle sensor for detecting the steering angle of the wheel, a shift position sensor for detecting a gear mode of a transmission, a left head lamp motor for displacing the left head lamp toward the left side of the vehicle, a right head lamp motor for displacing the right head lamp toward the right side of the vehicle, and an electronic control unit for controlling each operation of the left and right head lamp motors in response to signals from the wheel steering angle sensor and the shift position sensor.

According to another aspect of present invention, a method for controlling the system comprises the steps of determining a shift selector lever position; determining a On/Off state of head lamps when the shift selector lever position is determined to be in a reverse mode; determining a wheel steering angle when the head lamps are determined as being in an ON state; and operating a head lamp angle adjusting device in response to the determined wheel steering angle, thereby adjusting an illuminating angle of the head lamps for widening a driver's visual field.

BRIEF DESCRIPTION OF THE DRAWINGS

A more complete appreciation of this invention, and many of the attendant advantages thereof, will be readily apparent as the same becomes better understood by reference to the following detailed description, appended claims, and attached drawings, wherein:

DETAILED DESCRIPTION OF THE PREFERRED EMBODIMENTS

Figure 1:
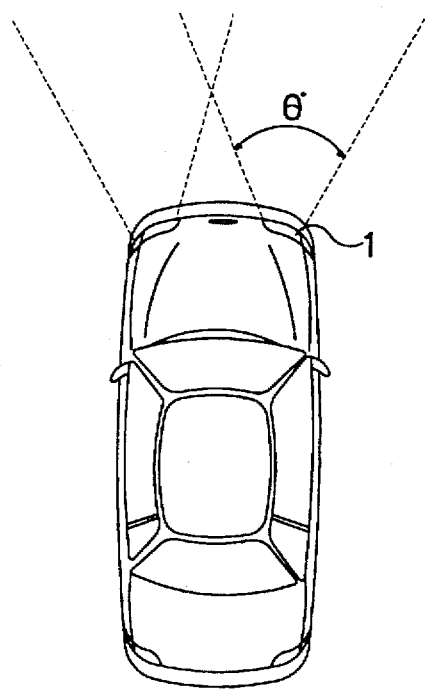
FIG. 1 is a top plan view illustrating an illuminating angle of a head lamp of a conventional vehicle.

Reference will now be made in detail to the present preferred embodiment of the invention an example of which is illustrated in the accompanying drawings. Wherever possible, the same reference numbers will be used when referring to the same or like parts, and the description for thereof will be omitted.

In addition, certain terminology will be used in the following description for the sake of convenience and reference, and is not to be construed as limiting the scope of the present invention. The words right and left will designate directions in the drawings to which reference is made.

Figure 2:
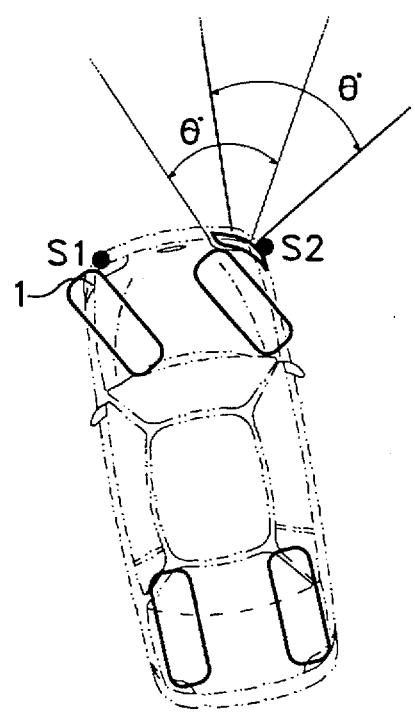
FIG. 2 is a plan view illustrating an illuminating angle of a head lamp of a vehicle in accordance with a preferred embodiment of the present invention.

Referring first to FIG. 2, a reverse cornering assisting system of a vehicle according to a preferred embodiment of the present invention includes: left and right cornering sensors S1 and S2, which are respectively mounted on left and right corners of the front side of the vehicle, for detecting objects which approach near the left and right corners; a warning device mounted near a driver for generating a warning sound to the driver when one of the cornering sensors detects an object approaching near one of the corners of the vehicle; and a head lamp angle adjusting device for adjusting the angle of left and right head lamps 1 toward left and right sides of the vehicle in accordance with the front wheel steering angle when the vehicle is in a reverse state.

Figure 3:
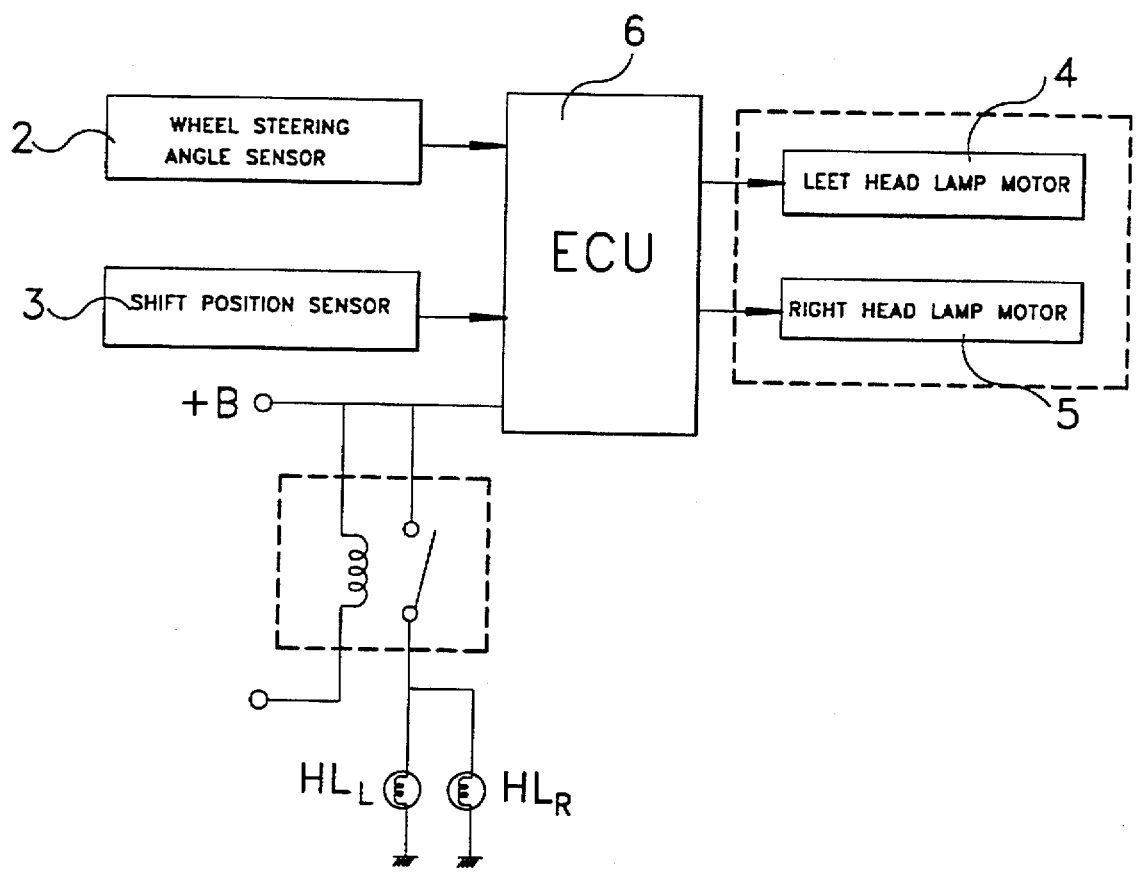
FIG. 3 is a block diagram illustrating a structure for varying a head lamp angle, when a vehicle is in a reverse state, in accordance with a preferred embodiment of the present invention.

Referring to FIG. 3 which illustrates the angle adjusting device of the head lamps 1, the device comprises: a wheel steering angle sensor 2 for detecting the steering angle of the wheel; a shift position sensor for detecting a gear ratio of a transmission; a left head lamp motor 4 for moving the left head lamp 1 toward the left side of the vehicle; a right head lamp motor 5 for moving the right head lamp 1 towards the right side of the vehicle; and an electronic control unit ("ECU") 6 for controlling each operation of the left and right head lamp motors 4 and 5 in response to signals from the wheel steering angle sensor 2 and the shift position sensor 3.

Figure 4:
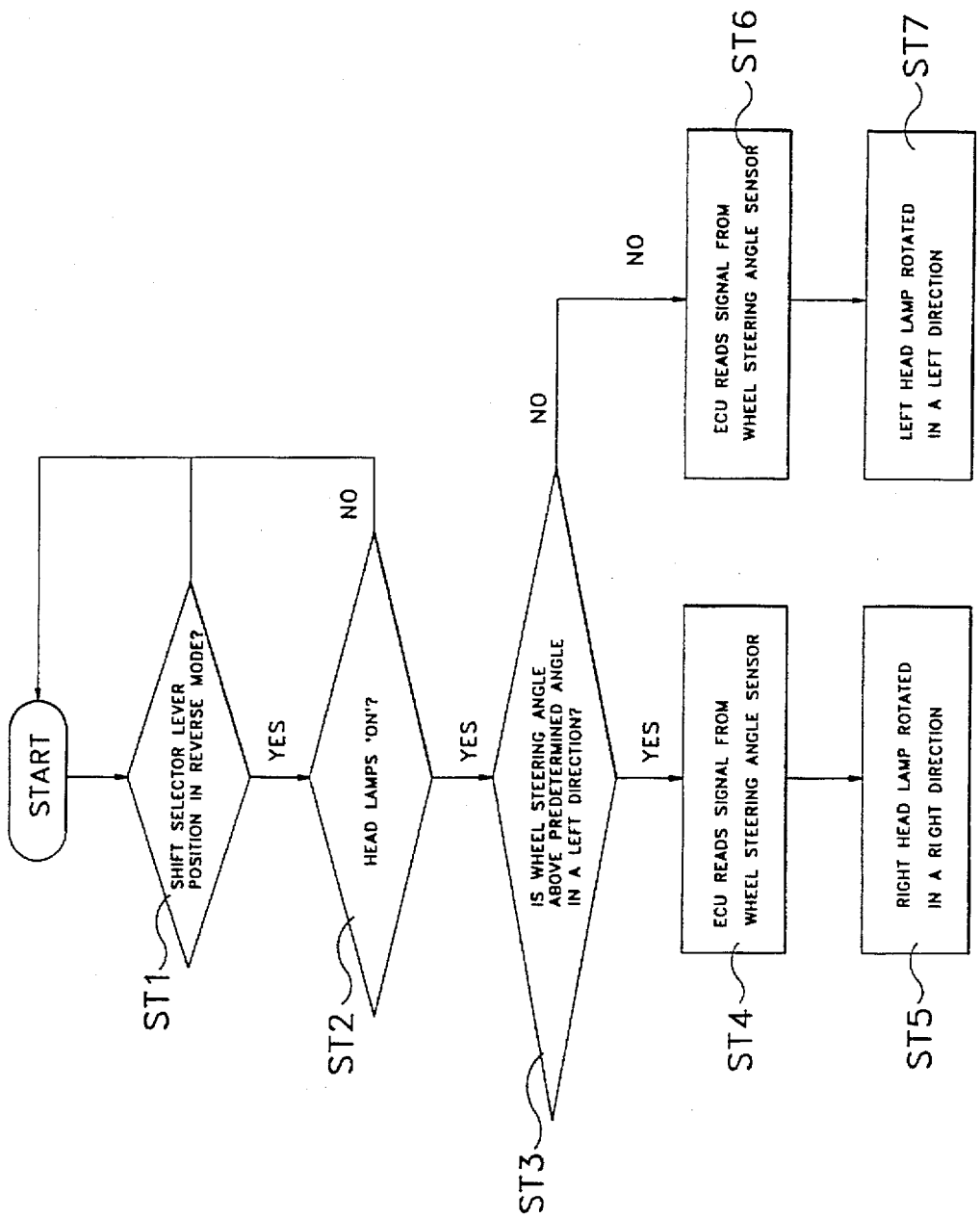
FIG. 4 is a flow chart illustrating a method for varying a head lamp angle, when a vehicle is in a reverse state, in accordance with a preferred embodiment of the present invention.

Refer now to FIG. 4 which illustrates a method for varying a head lamp angle when a vehicle is in a reverse state.

As a first step, the shift position sensor 3 detects a shift selector lever position to determine if it is in a reverse mode.

As a second step, if the detected shift selector lever position is determined to be in the reverse mode, On/Off states of the head lamps are detected.

As a third step, if the detected state of the head lamps is determined as being in an ON state, the steering angle sensor reads the wheel steering angle to determine if it is above a predetermined angle in a left direction.

As a fourth step, if the detected steering angle is determined to be above the predetermined angle, the ECU reads a signal from the wheel steering angle sensor 2.

As a fifth step, the ECU rotates the right head lamp in a right directing by operating the right head lamp motor 8 in response to the signal.

In the third step, however, if the detected wheel steering angle is determined not to be steered in the left direction, the ECU regards it that the wheels are steered to the left, and detects the signal from the wheel steering angle sensor 2 to rotate the left head lamp in a left direction in response to the signal.

Figure 5:
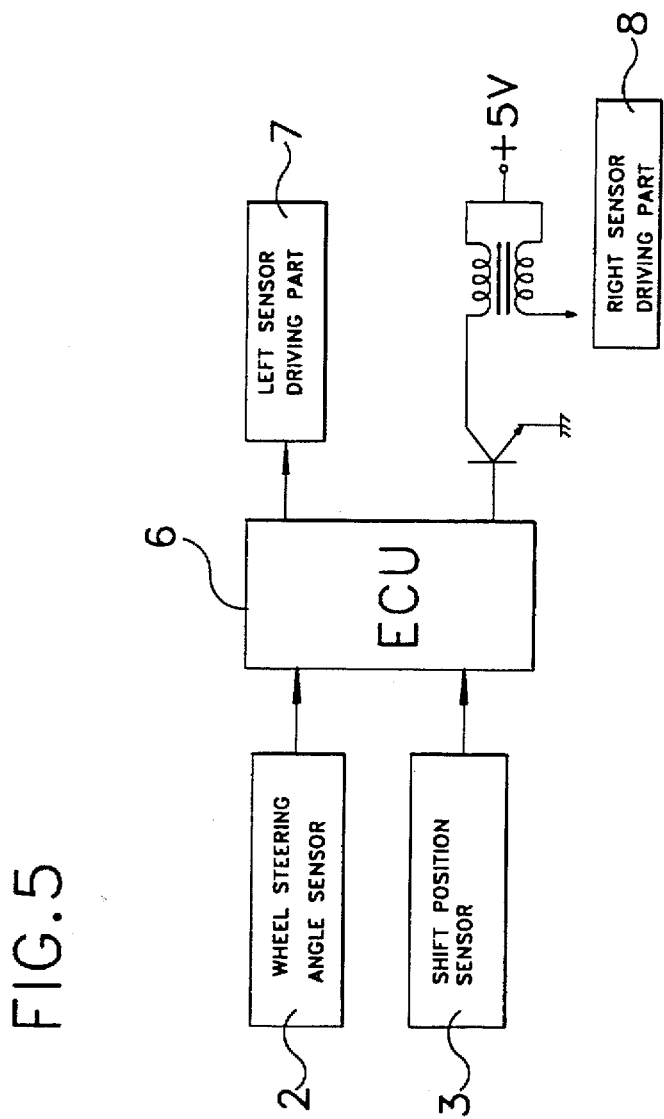
FIG. 5 is a block diagram illustrating a structure for controlling an operation of cornering sensors, when a vehicle is in a reverse state, in accordance with a preferred embodiment of the present invention.

FIG. 5 shows a structure for controlling an operation of the left and right cornering sensors S1 and S2 when a vehicle is in a reverse state. The left and right cornering sensors are respectively operated by each operation of the left and right sensor driving parts, 7 and 8, which are operated by the ECU in response to the signals from both the wheel steering angle sensor 2 and the shift position sensor 3. In addition, the cornering sensors are designed to detect an object approaching within 15 cm from the vehicle. Therefore, the warning device generate a warning sound only when one of the cornering sensors SI and S2 detects an object approaching within 15 cm from the vehicle.

Figure 6:
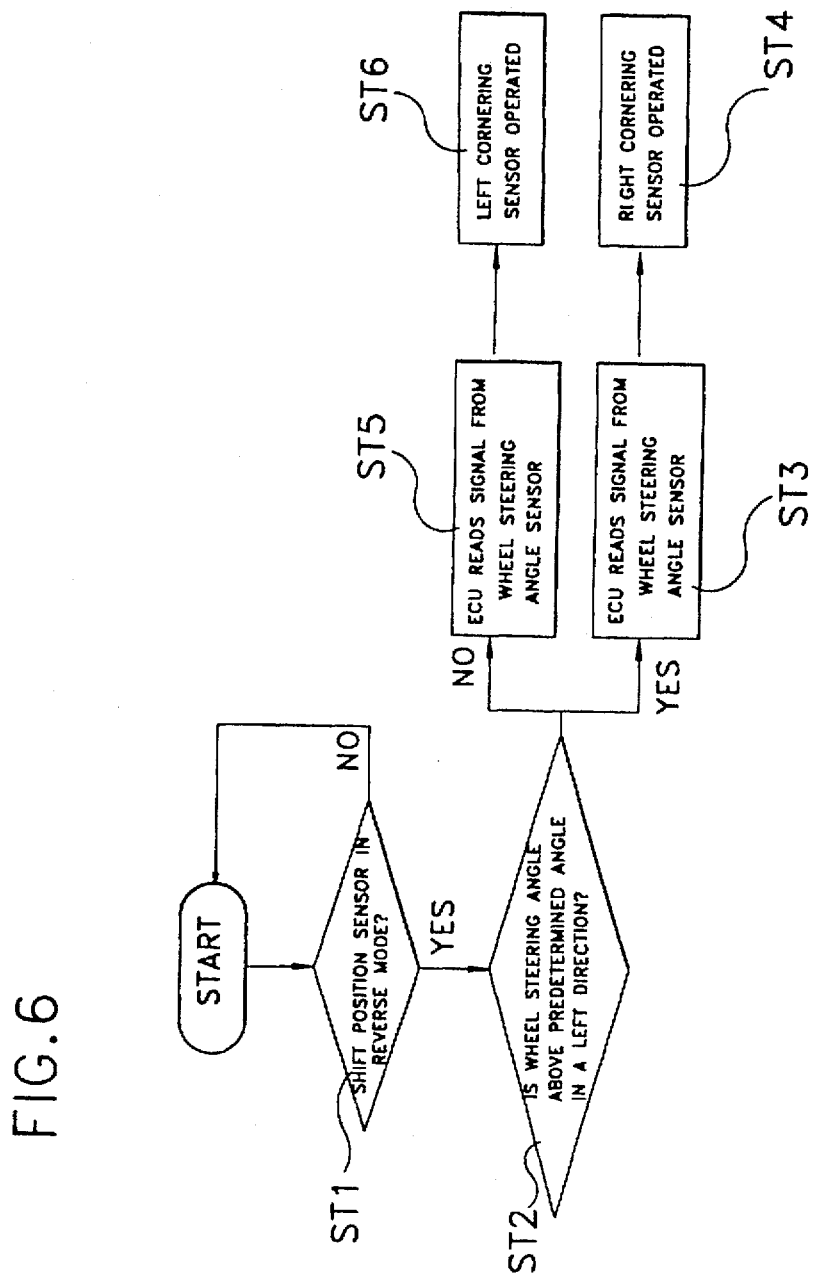
FIG. 6 is a flow chart illustrating a method for controlling an operation of cornering sensors, when a vehicle is in a reverse state, in accordance with a preferred embodiment of the present invention.

FIG. 6 illustrates a method for controlling, when a vehicle is in a reverse state, an operation of the cornering sensors.

As a first step, the shift position sensor 3 detects a shift selector lever position to determine if a shift selector lever position is in a reverse mode.

As a second step, if the detected position of the shift selector lever is determined as being in the reverse mode, the wheel steering angle sensor detects the wheel steering angle to determine if it is above a predetermined angle in a left direction.

As a third step, if the detected wheel steering angle is determined to be above the predetermined angle, the ECU 6 reads a signal from the wheel steering angle sensor 2.

As a fourth step, the ECU 6 operates the right cornering sensor drive part 8, thereby operating the right cornering sensor S2.

In the third step, however, if the detected wheel steering angle is determined not to be steered in the left direction, the ECU regards it that the wheels are steered toward the left, and detects the signal from the wheel steering angle sensor 2 to operate the left cornering sensor driving part 7, thereby operating the left cornering sensor S1.

While this invention has been described in connection with what is presently considered to be the most practical and preferred embodiments, it is to be understood that the invention is not limited to the disclosed embodiment, but, on the contrary, it is intended to cover various modifications and equivalent arrangements and methods included within the spirit and scope of the appended claims.

What is claimed is:

1. A system for assisting a reverse cornering of a vehicle, comprising:

left and right cornering sensors, which are respectively mounted on left and right corners of the front side of the vehicle, for detecting objects which approach near the left and right corners; and a warning device for generating a warning sound to a driver, when one of the cornering sensors detects objects approaching near the corners of the vehicle; and a head lamp angle adjusting device for adjusting the angle of at least one of the left and right head lamps toward left and right sides, respectively, of the vehicle in accordance with the wheel steering angle when the vehicle is in a reverse state; and wherein the head lamp angle adjusting device adjusts the angle of the left and right head lamps in a direction opposite to that of the direction of the steering wheel.

2. The system according to claim 1, wherein the cornering sensors are designed to detect an object approaching within 15 cm from the vehicle.

3. The system according to claim 1, wherein the angle adjusting device comprises:

a wheel steering angle sensor for detecting the steering angle of the wheel;

a shift position sensor for detecting a gear mode of a transmission;

a left head lamp motor for displacing the left head lamp toward the left side of the vehicle;

a right head lamp motor for displacing the right head lamp toward the right side of the vehicle; and an electronic control unit for controlling each operation of the left and right head lamp motors in response to signals from the wheel steering angle sensor and the shift position sensor;

wherein the electronic control unit controls each of the head lamps so as to adjust an angle of at least one of the head lamps in response to a signal from the wheel steering angle sensor.

4. The system of claim 1, wherein the warning device is mounted near a driver's seat.

5. The system of claim 3, wherein the electronic control unit controls each of the head lamps so as to adjust an angle of at least one of the head lamps to a direction opposite to that of a direction of a steering wheel in response to a signal from the steering wheel angle sensor.

6. A method for controlling a reverse cornering assisting system of a vehicle, comprising the steps of:

determining a shift selector lever position;

determining a wheel steering angle when the shift selector lever position is determined to be in a reverse mode;

determining if an object is in existence within a predetermined distance from the vehicle; and adjusting the angle of the left and right head lamps in a direction opposite to that of the direction of the steering wheel in response to a signal from the determined steering angle.

operating a warning device when an object is determined to exist within the predetermined distance from the vehicle, thereby alerting a driver.

7. A method for controlling a reverse cornering assisting system of a vehicle, comprising the steps of:

determining a shift selector lever position;

determining an On/Off state of head lamps when the shift selector lever position is determined to be in a reverse mode;

determining a wheel steering angle when the head lamps are determined as being in an ON state; and operating a head lamp angle adjusting device in response to the determined wheel steering angle, thereby adjusting an illuminating angle of at least one of the head lamps so as to widen a driver's visual fields;

wherein the electronic control unit controls each of the head lamps so as to adjust an angle of at least one of the head lamps in a direction opposite to that of the direction of the steering wheel in response to a signal from the wheel steering angle sensor.

8. The system of claim 7, wherein the electronic control unit controls each of the head lamps so as to adjust an angle of at least one of the head lamps to a direction opposite to that of a direction of a steering wheel in response to a signal from the steering wheel angle sensor.

* * * * *